United States Patent [19]
Lockhart et al.

[11] Patent Number: 6,022,502
[45] Date of Patent: Feb. 8, 2000

[54] COMPOSITE FRICTION ASSEMBLY

[76] Inventors: Wayne Lockhart, 120 Algonquin Rd., North East, Md. 21901; John J. Carney, 1164 Park Pl., Washington Crossing, Pa. 18977

[21] Appl. No.: 08/956,620

[22] Filed: Sep. 30, 1997

[51] Int. Cl.$^7$ .................................................. B29C 43/02
[52] U.S. Cl. ........................................... 264/113; 264/122
[58] Field of Search ..................................... 264/113, 122

[56] References Cited

U.S. PATENT DOCUMENTS

| | | | |
|---|---|---|---|
| 2,686,140 | 8/1954 | DeGaugue, Jr. et al. | |
| 4,042,085 | 8/1977 | Bjerk et al. | 192/57 |
| 4,044,188 | 8/1977 | Segal | 428/283 |
| 4,098,943 | 7/1978 | Degginger et al. | 428/283 |
| 4,119,591 | 10/1978 | Aldrich | 260/17 |
| 4,173,681 | 11/1979 | Durrieu et al. | 428/409 |
| 4,197,352 | 4/1980 | Emmett et al. | 428/409 |
| 4,244,994 | 1/1981 | Trainor et al. | 428/37 |
| 4,374,211 | 2/1983 | Gallagher et al. | 523/156 |
| 4,411,851 | 10/1983 | Sakabe et al. | 264/137 |
| 4,631,209 | 12/1986 | Baker et al. | 427/392 |
| 4,659,758 | 4/1987 | Landi et al. | 524/35 |
| 4,669,511 | 6/1987 | Steiner | 139/185 |
| 4,757,120 | 7/1988 | Bristowe et al. | 525/534 |
| 4,944,373 | 7/1990 | Ohya et al. | 188/251 |
| 5,080,969 | 1/1992 | Tokumura | 428/327 |
| 5,114,769 | 5/1992 | Kani et al. | 428/37 |
| 5,132,065 | 7/1992 | Christie | 264/122 |
| 5,380,776 | 1/1995 | Hibbert | 524/145 |
| 5,433,907 | 7/1995 | Ogiwara et al. | 264/117 |
| 5,895,616 | 4/1999 | Yumoto et al. | 264/69 |

*Primary Examiner*—Mary Lynn Theisen
*Attorney, Agent, or Firm*—John S. Child, Jr.; Dann Dorfman Herrell & Skillman

[57] ABSTRACT

A composite friction assembly is disclosed which comprises at least one friction member and a support member. Each of the friction member and the support member have a composition comprising a thermosettable resin and a filler material. The friction member and the support member each have a planar surface, with the respective planar surfaces being joined at their interface, so as to define a boundary layer. The composition of each member is substantially confined to separate sides of the boundary layer whereby the composition of the friction member does not substantially penetrate beyond the boundary layer into the composition for the support member and the composition for the support member does not substantially penetrate beyond the boundary layer into the composition for the friction member. Among the disclosed embodiments of the present invention is a brake pad, such as that used in vehicular brakes. The present invention further relates to a method of making such a composite friction assembly.

7 Claims, 3 Drawing Sheets

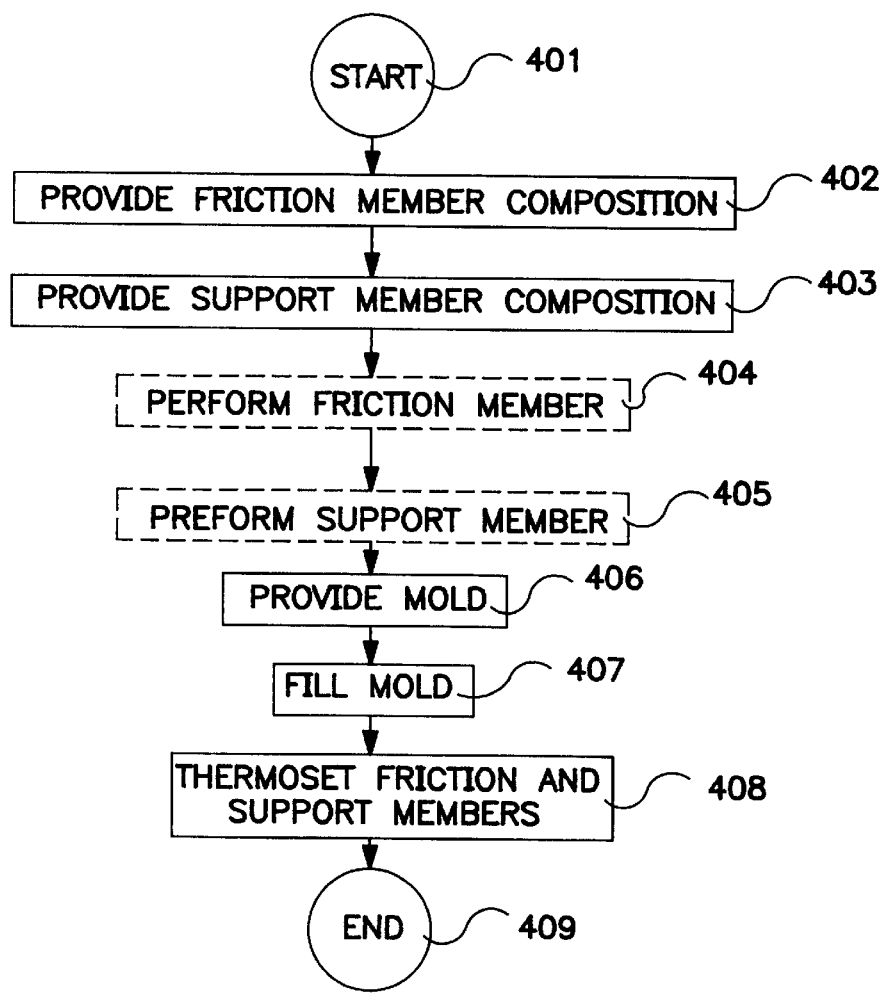
FIG. 4
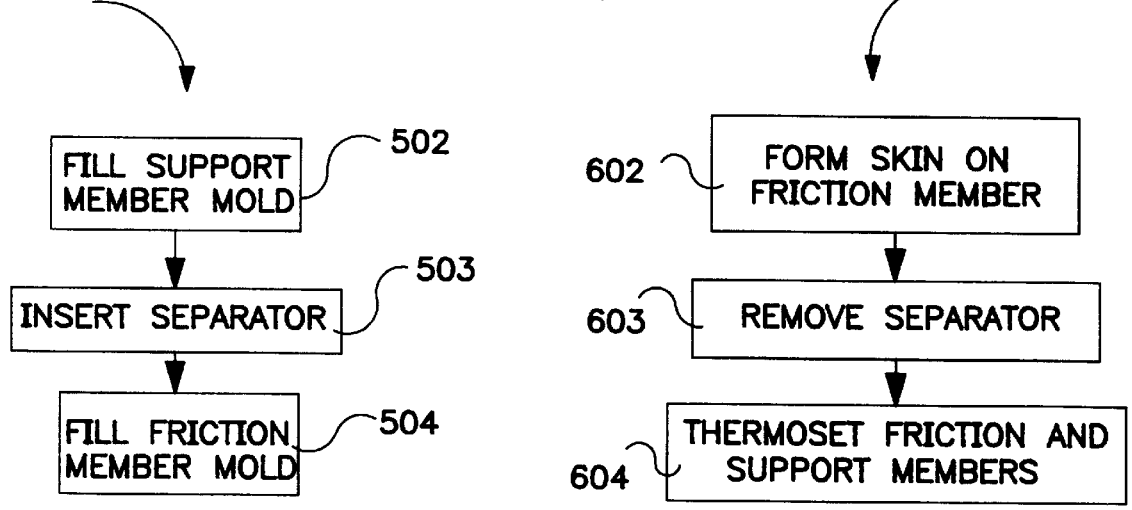
FIG. 5
FIG. 6

COMPOSITE FRICTION ASSEMBLY

FIELD OF THE INVENTION

The present invention relates to composite materials and, in particular, to improvements in composite friction assemblies such as those in brake pads for automotive use.

BACKGROUND OF THE INVENTION

Automobile disc brakes function by attaching a rotor to a spindle about which a wheel rotates. A brake pad is provided which is made to contact the rotor by the action of a caliper. When the caliper is activated, the brake pad rubs against the rotor and frictional contact of the brake pad and the rotor causes the rotor to slow down and stop turning.

A typical brake pad comprises a brake shoe, consisting of a metal (e.g., steel) plate which mounts into the caliper, and a friction member or brake lining affixed to the brake shoe. The brake lining is that part of the brake pad that actually comes into contact with the rotor when the caliper is activated. The brake lining is composed of a friction material, of which asbestos has traditionally been a major component.

It would be highly beneficial to provide a composite friction assembly comprising a lightweight, reinforced plastic support member capable of withstanding the rigorous conditions typically encountered in automobile disc brakes. Such a brake pad will be of substantially lighter weight than current brake pads which comprise metal support members. A reduction in the weight of automobile components is extremely desirable since it results in improved fuel efficiency which has been a government-mandated objective for automobile manufacturers.

Preferably, the composite friction assembly should be simple and inexpensive to manufacture. Accordingly, the composite friction assembly should allow for the use of a friction member composed of conventional friction materials and conventional friction resins, as well as organic, non-asbestos organic, semi-metallic, or low-metallic materials. In addition, the boundary layer between the friction member and the support member should be substantially planar and of minimal thickness.

The problems associated with known composite friction assemblies are solved to a large degree in accordance with the present invention.

SUMMARY OF THE INVENTION

According to the present invention, there is provided as an article of manufacture, a composite friction assembly having at least one friction member and a support member. Each of the friction member and the support member is formed from a composition comprising a thermosettable resin and a filler material. In addition, the friction member and the support member each have a planar surface. The planar surface of one member confronts the planar surface of the other member to provide a substantially planar interface between the respective members, so as to define a boundary layer.

The composition of each member is substantially confined to separate sides of the boundary layer, whereby the composition of the friction member does not substantially penetrate beyond the boundary layer into the composition for the support member and the composition for the support member does not substantially penetrate beyond the boundary layer into the composition for the friction member. In one particular embodiment, the composite friction assembly is a brake pad, such as the type used in vehicular brakes.

The present invention also relates to a method of making a composite friction assembly. A first composition for a support member is provided having a thermosettable resin and a filler material. A second composition for a friction member is provided also having a thermosettable resin and a filler material. The first and second compositions are optionally compressed to form a support member preform and a friction member preform, respectively. A mold is provided having a first chamber for receiving the first composition and a second chamber for receiving the second composition. The first and second chambers are arranged so that the friction member and the support member confront each other along a planar interface at the interconnection of the chambers. The first and second compositions are inserted into the first and second chambers of the mold, respectively. Heat and pressure are applied to the compositions in the chambers of the mold in order to thermoset the compositions of both of the members and unite the members into an integral unitary structure along an interface. The interface defines a boundary layer which comprises a mixture of the compositions for the friction member and the support member. The application of heat and pressure is controlled so that the composition of the friction member does not substantially penetrate beyond the boundary layer and intermix with the composition for the support member and the composition for the support member does not substantially penetrate beyond the boundary layer and intermix with the composition for the friction member.

BRIEF DESCRIPTION OF THE DRAWINGS

The foregoing summary, as well as the following detailed description of certain preferred embodiments of the present invention, will be better understood when read in conjunction with the accompanying drawings, in which:

FIG. 4 is a flow chart showing the steps involved in the method of making a composite friction assembly in accordance with the present invention;

FIG. 5 is a flow chart showing the steps involved in filling the mold with the compositions for the friction member and the support member; and FIG. 6 is a flow chart showing the steps involved in thermosetting the friction member and the support member.

DETAILED DESCRIPTION OF THE PREFERRED EMBODIMENTS

Figure 1:
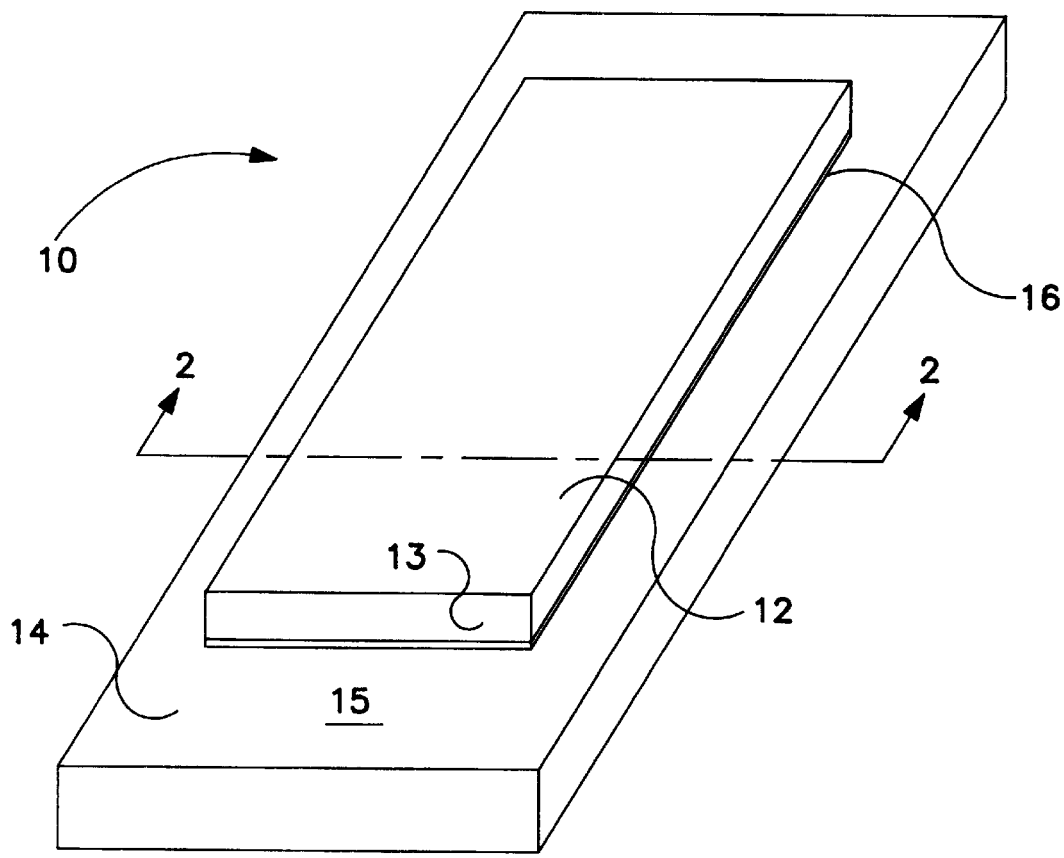
FIG. 1 is a top, front perspective view of a composite friction assembly in accordance with the present invention.
Figure 2:
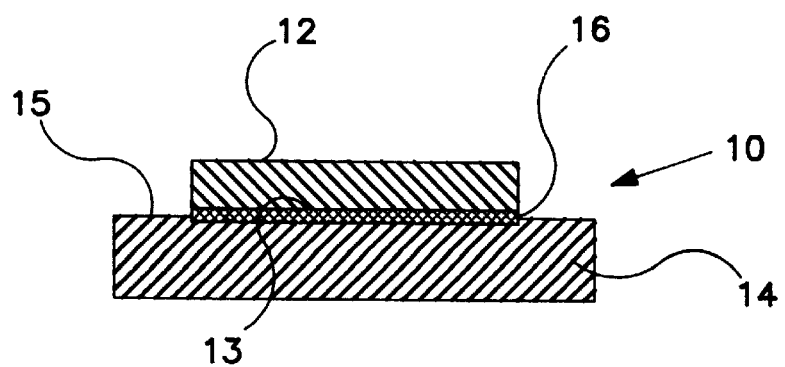
FIG. 2 is a cross-sectional view of the composite friction assembly shown in FIG. 1 taken along the line 2—2.

The present invention generally relates to a composite friction assembly 10 as depicted in FIGS. 1 and 2. The composite friction assembly 10 comprises a friction member 12 and a support member 14. The friction member 12 and the support member 14 each have a planar surface, 13 and 15 respectively, arranged so as to confront one another to form a substantially planar interface therebetween. The interface between the friction member 12 and the support member 14 defines a boundary layer 16 comprising a mixture of the compositions for the friction member 12 and the support member 14.

The friction member 12 is made of a composition including a thermosettable resin and at least one filler material. The filler material used in the composition for the friction member 12 is generally an organic, asbestos-free organic, semi-metallic, or low-metallic material. Suitable filler materials for the friction member include, but are not limited to, fibers (e.g., potassium octatitinate fiber, glass fibers, carbon fibers, boron, silica, ceramic, metallic fibers, and textile fibers), rubbers (e.g., natural, 30% styrene+70% butadiene, nitriles, acrylo-nitriles, butyl, polychloropropene, chlorobutyl, ethylene propylene terpolymer, polyolefin, reclaimed, and pulverized scraps), accelerators or vulcanization agents (e.g., sulphur, zinc oxide, magnesium oxide, mercaptobenzothiazole sulfide, cumates, altax, cobalt naphthenate, and hexamethylenetetramine), barium sulphate, metals or alloys (e.g., lead, copper, zinc, aluminum, brass, antimony, tin, bismuth, iron powder, cast iron powder, and steel wool), metallic by-products (e.g., litharge, galena, lead silicate, lead carbonate, copper sulfides, copper oxide, antimony sulfide, molybdenum sulfide, iron oxides, iron sulfide, zinc sulfide, aluminum oxide, chromium oxide, and titanium oxide), friction modifiers (e.g., organics, resins from cashew nut oil, graphite, inorganics, silica, aluminum oxides, cyanites rottenstone, chromium oxides, scories, glass balls, and zirconium silicate), calcium aluminate, potassium bichromate, antioxidizings (e.g., agerite), carbon black, wood flour, petroleum coke, lime, coal chalk, kaolin, marble powder, clays, talc, and lead formiate. Suitable resins for use in the friction member 12 are listed in Table 1.

The support member 14 is made of a composition including a thermosettable resin and at least one filler material in lieu of stamped, punched, extruded, cast or forged ferrous and non-ferrous metals. Suitable support member materials include plastic and non-plastic binders reinforced with organic or inorganic filler fibers. The support member 14 can be reinforced as desired to meet the strength requirements of a specific application, by adding a reinforcing material to the resin. Suitable filler and reinforcing materials include, but are not limited to, fibers (e.g., glass, silica, boron, potassium octatitinate, ceramic, graphite, carbon, chopped asbestos cloth, asbestos threads, metallic fibers, and textile fibers), rubbers (e.g., natural, 30% styrene+70% butadiene, nitrites, acrylonitriles, butyl, polycholoroprene, cholorobutyl, ethylene propylene terpolyrmer, polyolefin, regenerated, and pulverized scraps), accelerators or vulcanization agents (e.g., sulphur and hexamethylenetetramine), lime, chalk, marble powder, carbon black, wood flour, magnesium stearate, mold release agents, low profile additives, and viscosity reducing compounds. Suitable resins for use in the support member 14 are listed in Table 2.

TABLE 1

| RESINS FOR FRICTION MEMBER | MANUFACTURER/SOURCE |
| --- | --- |
| Formophenolic resins: | |
| (a) unmodified | HRJ-1202 (Schenectady); |
| (b) modified (oils, rubber) | No. 78695 (Rurez) |
| (c) organic | SP-8014 (Schenectady) |
| (d) inorganic (boron, silane, aluminum) straight phenol or substituted phenols (cresol, xylenol) | HRJ-652 (Schenectady) |
| Formol urea, melamine, other nitrogenous by-products | CYMEL ® resins (Cyanamid); FRS-774 (Schenectady) |
| Thermostable resins other than phenolic resins (polyimide, polyesterimide, polyamideimide, polybenzimidazole, polyphenylsulfide, polycarbonate, polyamide, polyester) | HRJ-1492 (Schenectady); BT 2680 (Mitsubishi International) |
| Epoxy resins | FIBERITE E-26014 (ICI) |
| Phenolic resins | FRJ-484, HRJ-1328, HRS-1797, HRJ-1835 (Schenectady) |
| Triazine resins | BT-2160, BT-2170, BT-2562F (Mitsubishi International) |
| Polyester resins | 1500 Series (Plastic Engineering Co.) |

TABLE 2

| RESINS FOR SUPPORT MEMBER | MANUFACTURER SOURCE |
| --- | --- |
| Formophenolic resins: | |
| (a) organic modified (oils, rubber) | HRJ-2302 (Schenectady); No. 78695 (Durez) |
| (b) inorganic modified (boron, silane, aluminum) | BR5 377 (Schenectady) |
| (c) from straight phenol (resole) | SP-8014 (Schenectady) |
| (d) unmodified phenolic | HRJ-652 (Schenectady) |
| (e) homologe of phenole or formaldehyde (cresol, xylenol, furfural, benzaldehyde, crotonaldehyde) | CR5-634 (Schenectady) |
| Formol urea, melamine, other nitrogenous resins | CYMEL ® resins (Cyanamid); FR5-774 (Schenectady) |
| Thermostable resins other than phenolic resins (polyimide, polyesterimide, polyamideimide, polybenzimidazole, polyphenylsulfide, polycarbonate, polyamide, polyester triazine, . . . ) | HRJ-1492 (Schenectady); BT 2680 (Mitsubishi International) |

TABLE 2-continued

| RESINS FOR SUPPORT MEMBER | MANUFACTURER SOURCE |
| --- | --- |
| Epoxy resins | FIBERITE ® E-260H (ICI); FIBERITE ® 8130E (ICI) |
| Phenolic resins | FRJ-484, HRJ-1328, HRS-1797, HRJ-1835 (Schenectady) |
| Polyester resins | 1500 Series (Plastic Engineering Co.) |

In a preferred embodiment, the composition for the support member contains a polyimide resin, such as the resin disclosed in U.S. Pat. No. 4,757,120 (Bristowe et al.), which is incorporated by reference herein. In another preferred embodiment, the composition :-or the support member contains a polyester resin, such as the resin described in U.S. Pat. No. 5,380,776 (Hibbert), which is also incorporated by reference herein. In the most preferred embodiment, the composition for the support member contains an epoxy resin coated fiber, such as FIBERITE® fiber (E-260H, FM8130EIC Fiberite).

The resins used in the compositions for the friction member 12 and the support member 14 are selected to confine the composition of each member 12 and 14 to its respective side of the boundary layer 16 so that the thickness of the boundary layer 16 is small compared to the total thickness of the composite friction assembly 10. In one embodiment, the thickness of the boundary layer 16 is less than about 5%, or better yet less than about 3%, of the total thickness of the composite friction assembly 10. Alternatively, the resins used in the compositions for the friction member 12 and the support member 14 can be selected so that there is essentially no boundary layer between the friction member 12 and the support member 14. In view of the foregoing, it is preferable to choose resins which are immiscible when compacted prior to thermosetting or curing of the resins. Further, the resin used in the composition for the friction member 12 preferably has a lower curing temperature than the curing temperature of the resin used in the composition for the support member 14. Additionally, the compositions for the friction member 12 and the support member 14 can have a liquid phase prior to thermosetting wherein the liquid phase of each composition exhibits different flow rate and setting time characteristics dependent upon the temperature of the composition.

A composite friction assembly 10 can be made in accordance with the present invention to yield a Gogan hardness of more than about 27, a flexing strength of more than about 8.7 MPa (1256 psi), and a breaking strength of more than about 8.7 MPa (1256 psi). Accordingly, a composite friction assembly 10 in accordance with the present invention is capable of satisfying the requirements for a wide range of applications where a high strength, low weight composite friction assembly is needed.

Preferably, for safety purposes, the support member 14 has a flexing strength which is greater than the flexing strength of the friction member 12 and a breaking strength which is greater than the breaking strength of the friction member 12.

Figure 3:
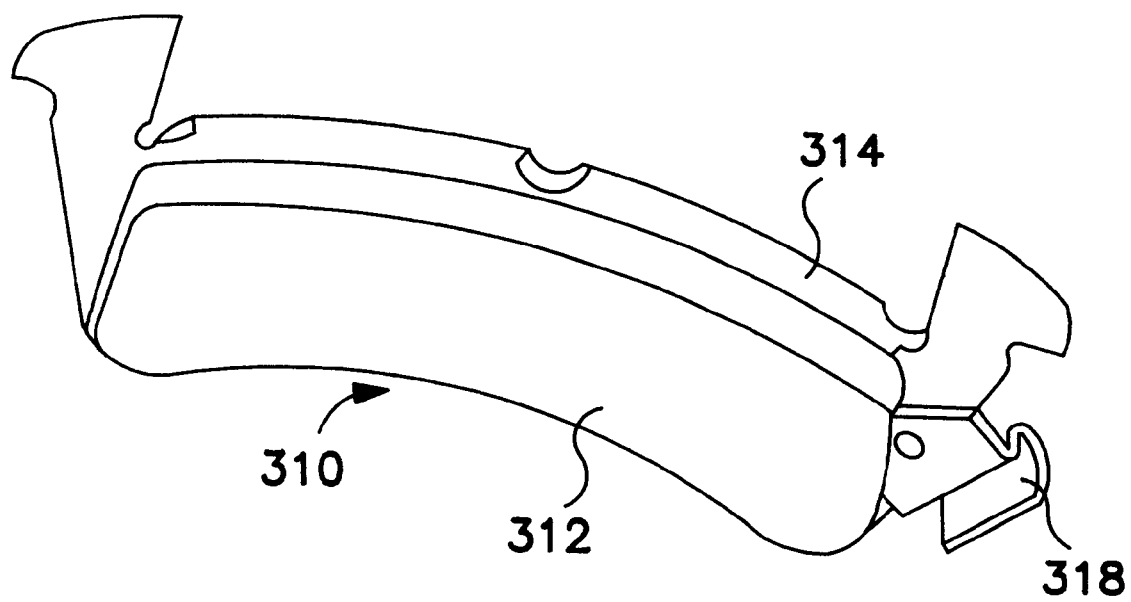
FIG. 3 is a top, front perspective view of a brake pad in accordance with the present invention.

In one embodiment of the present invention, the composite friction assembly 10 is made in the form of a brake pad 310, as shown in FIG. 3. The brake pad 310 comprises a brake lining 312 and a brake shoe 314. The brake lining 312 and brake shoe 314 are generally analogous to the friction member 12 and support member 14, respectively, which have been described above.

The brake shoe 314 is usually reinforced to meet the strength requirements of a vehicular brake pad by adding a reinforcing material, such as glass or metallic fibers, to the resin from which it is made. In addition, various materials may be added to the composition for the brake shoe 314 to enhance various characteristics, e.g., rubber in order to reduce sound attenuation or ceramic to reduce thermal conductivity.

As shown in FIG. 3, the brake shoe 314 is shaped to allow the brake pad 310 to be inserted into the caliper of a vehicular disk brake. Also shown is the use of an optional wear indicator 318, which contacts the rotor when the brake lining 312 wears to a predetermined thinness thereby producing an audible squeal.

The present invention also relates to a method for forming a composite friction material 10 in a mold by integrally molding thermosettable resin compositions which yield a friction member 12 and a support member 14, as shown in FIGS. 4–6. The process starts with Step 401. A first composition for the friction member 12 is provided having a thermosettable resin and a filler material in Step 402. A second composition for the support member 14 is provided having a thermosettable resin and a filler material in Step 403.

In Step 404, the composition for the friction member 12 is optionally compressed, to form a friction member preform, under conditions of temperature and pressure that are less stringent than the conditions required to thermoset the resin in the composition for the friction member 12. If the composition for the friction member 12 contains organic non-asbestos mixtures, the friction member 12 preform can be manufactured by placing a quantity of the mixture in a mold and pressing at a pressure of about 3.4–13.8 Mpa (500–2000 psi) with a dwell time in the mold of between about 1 and 15 seconds. If the composition for the friction member 12 contains a hydrocarbon cold molding formulation, the friction member 12 preform can be manufactured by uniformly mixing the molding formulation and then cold molding the formulation at pressures of about 13.8–34.5 MPa (2000–5000 psi). The preform is then cured by heating the preform at temperatures of between about 350° F. (177° C.) and 600° F. (316° C.) for a period of several hours.

In Step 405, the composition for the support member 14 is optionally compressed to form a support member preform, under conditions of temperature and pressure that are less stringent than the conditions required to thermoset the resin in the composition for the support member 14.

A mold is provided, in Step 406, comprising a first chamber for shaping the support member 14, a second chamber for shaping the friction member 12, and a removable separator for separating the first chamber and the second chamber. The separator is preferably a thin, flat metal plate coated with a lubricating material to facilitate removal of the separator, as described below. The first and second chambers are arranged so that the confronting surfaces 13 and 15 of the friction member 12 and the support member 14 are juxtaposed along a planar interface at the interconnection of the chambers.

Flow charts setting forth the steps involved in the molding and thermosetting operations are shown in FIGS. 5 and 6. In Step 502 of FIG. 5, the first chamber of the mold is filled with a composition for the support member 14 in pulverulent form or with a support member preform as formed in Step 405. The removable separator is then inserted into the mold in Step 503. In Step 504, the second chamber of the mold is filled with a composition for the friction member 12 in pulverulent form or with a friction member preform as formed in Step 404. The removable separator maintains the compositions for the friction member 12 and the support member 14 in their respective chambers of the mold. The compositions may then be cured at a temperature of between about 160° F. (71° C.) and 400° F. (204° C.) for between about 10 and 20 minutes at a pressure of about 13.8–55.2 MPa (2000–8000 psi). The compositions are optionally degassed at the end of 1 and 2.67 minutes. The temperature is then increased linearly over a period of between about 1 and 2 hours to about 300° F. (149° C.)–400° F. (204° C.) and then held at that temperature for the remaining time period.

The resins in the respective compositions used to form the friction member 12 and support member 14 are cured or hardened in the manner shown in FIG. 6. At Step 602, heat and pressure are applied to the mold for a length of time sufficient to cause a thin film or skin of partially cured thermoset resin to form on the outside surface of the friction member 14. Preferably, a pressure of about 13.8–55.2 MPa (2000–8000 psi) and a temperature of about 160° F. (71° C.)–400° F. (204° C.) is applied for about 0.5–2 minutes. At Step 603, the separator between the first and second chambers of the mold is removed so that the compositions for the friction member 12 and the support member 14 come into contact along the interface between the two members 12 and 14. In Step 604, the application of heat and pressure is continued so that: the resins in the compositions for the friction member 12 and the support member 14 are completely cured and degassed. To that end, a pressure of about; 13.8–55.2 MPa (2000–8000 psi) and a temperature of about 160° F. (71° C.)–400° F. (204° C.) are preferably applied for about 5–20 minutes. This process assures that the friction member 12 and the support member 14 are united into an integral, unitary structure in such a manner that the boundary layer 16 between the friction member 12 and the support member 14 is of minimal thickness and substantially parallel to the surfaces 13 and 15 of the friction member 12 and support member 14, respectively. The edges of the support member 14 and friction member 12 are then trimmed to remove excess material. Optionally, the friction member 12 and support member 14 are post-baked while under constraint in a forming container to prevent swelling for about of 1.5–9 hours.

Although the preferred embodiment of the present invention described herein involves integrally molding the friction member 12 and the support member 14, the friction member 12 and the support member 14 can alternatively be molded separately and riveted together, molded separately and bonded together, cut to shape and riveted together, or cut to shape and bonded together if desired. Such alternatives are within the scope of the present invention.

EXAMPLES

In order to demonstrate the utility of a brake pad made in accordance with the present invention brake pads were prepared and tested having friction members of the composition given in Table 3 backed by support members of the composition given in Table 4. The friction member and support member compositions are in accordance with the present invention.

TABLE 3

| Material | Distributor | Wt. % |
|---|---|---|
| Steel Wool S-202 | American Metal Fibers | 5.2 |
| H570C ceramic fiber | UNIFRAX | 5.6 |
| Kevlar Pulp | Dupont | 1.3 |
| Copper fiber | GMT | 6.3 |
| FRJ484 | Schenectady | 14.5 |
| Magnesium Oxide | Tateho | 3.1 |
| Barytes | Cyprus Ind. | 33.4 |
| Vermiculite | W. R. Grace | 18.9 |
| JDZ Graphite | Dixon | 3.9 |
| 4001 rubber | Palmer | 7.3 |

TABLE 4

| Material | Distributor | Wt. % |
|---|---|---|
| Kevlar Pulp | Dupont | 7 |
| UN512 (RK-30) | R. K. Carbon Fibers | 7 |
| Zeon 1411 | Zeon | 5 |
| Suzorite Mica | Suzorite Mica Prod. Inc. | 7 |
| Vermiculite | W. R. Grace | 10 |
| FIBERITE ® 8130E | ICI | 64 |

The brake pads tested were prepared by preforming the friction members at a pressure of 9.8 MPa (1413 psi) with no dwell time. The support members were preformed at a pressure of 32.5 MPa (4711 psi) with a 5 second dwell time. The preformed support and friction members were then loaded into their respective chambers of a mold with the chambers being separated by a separator plate as described above. A press, operated at 300° F. (149° C.), was used to apply a pressure of 36.0 MPa (5223 psi) to the preforms. The preforms were molded with the separator plate in place between the friction and support preforms for 30 seconds to 2 minutes. The separator plate was then removed and a pressure of 36.0 MPa (5223 psi) was re-applied. The preforms were cured for 15 minutes with degassing at 1 minute and 2.67 minutes to form the brake pads. The brake pads were then heated to 400° F. (204° C.) over a 2 hour period, maintained at 400° F. (204° C.) for 8 hours, and then cooled to room temperature in 1 hour.

The breaking strengths (transverse rupture strengths) of the brake pads were measured using a testing machine with a transverse rupture test fixture. The brake pad was positioned on the test fixture, with the support member side down, so that the brake pad was supported by two 9.52 mm (0.375 inch) diameter rods spaced 9.65 cm (3.80 inch) apart. The tests were run on brake pads which were unbaked, as well as on brake pads which were baked at 300° F. (149° C.) for 8 hours. The results of five tests were averaged and the average values are reported in Table 5.

TABLE 5

| | Breaking Strength |
|---|---|
| unbaked | 96 lbs (43 kg) |
| baked | 170 lbs (77 kg) |

The brake pads were also tested to determine the wear characteristics of the friction lining using 10 and 15 stop fade and 56 spike stops. A stop counter was used to record the number of stops. The results are given in Table 6.

TABLE 6

| Wear (inches) | Average |
|---|---|
| LFO[1]: 0.031, 0.015, 0.032, 0.017, 0.013 | 0.022 |
| LFI[2]: 0.014, 0.009, 0.012, 0.016, 0.021 | 0.014 |
| RFO[3]: 0.027, 0.009, 0.029, 0.008, 0.012 | 0.017 |
| RFI[4]: 0.013, 0.007, 0.008, 0.017, 0.012 | 0.011 |

[1]"LFO" indicates measurements made on the left, front, outer brake.
[2]"LFI" indicates measurements made on the left, front, inner brake.
[3]"RFO" indicates measurements made on the right, front, outer brake.
[4]"RFI" indicates measurements made on the right, front, inner brake.

It will be recognized by those skilled in the art that changes or modifications may be made to the above-described preferred embodiments without departing from the broad inventive concepts of the invention. It should therefore be understood that this invention is not limited to the particular embodiments described herein, but is intended to include all changes and modifications that are within the scope and spirit of the invention as set forth in the following claims.

What is claimed is:

1. A method of making a composite friction assembly having at least one friction member and a support member, each member having a planar surface, the planar surface of one member confronting the planar surface of the other member to provide a substantially planar interface between the friction member and the support member, the method comprising the steps of:
   a. providing a first composition for the friction member having a thermosettable resin and a filler material in pulverulent form;
   b. providing a second composition for the support member having a thermosettable resin and a filler material in pulverulent form;
   c. providing a mold having a first chamber for receiving the first composition and a second chamber for receiving the second composition, the first and second chambers being arranged so that the confronting surfaces of the friction member and the support member confront one another along a planar interface at the interconnection of the chambers;
   d. inserting the first and second compositions into the respective chambers of the mold; and
   e. applying heat and pressure to the compositions in the chambers to thermoset the pulverulent compositions of both of the members and unite the members into an integral unitary structure wherein the interface defines a boundary layer comprising a mixture of the compositions for the friction member and the support member, the improvement wherein the heat and pressure applied to the respective compositions are controlled to substantially confine the composition of each member to separate sides of the boundary layer, whereby the composition of the friction member does not substantially penetrate beyond the boundary layer into the support member and the composition of the support member does not substantially penetrate beyond the boundary layer into the friction member.

2. The method according to claim 1 wherein the composition for the friction member is compressed to provide a friction member preform prior to insertion of the first composition into the first chamber of the mold.

3. The method in accordance with claim 1 wherein the composition for the support member is compressed to provide a support member preform prior to insertion of the second composition into the second chamber of the mold.

4. The method according to claim 1 wherein the application of heat and pressure is controlled to limit the thickness of the boundary layer to less than about 5% of the total thickness of the composite friction assembly.

5. The method according to claim 1 wherein the application of heat and pressure converts the compositions of the friction member and the support member from a pulverulent form, to a fluid state, and then to a solid state, the duration of the fluid state being dependent upon the temperature of the heat applied.

6. The method according to claim 1 wherein the heat and pressure are applied for a length of time sufficient to cause a thin skin of partially thermoset resin to form on the support member prior to uniting the members into an integral unitary structure.

7. The method in accordance with claim 6 comprising the steps of:
   a. inserting a separator between the first and second chambers of the mold prior to the application of heat and pressure; and
   b. removing the separator from between the first and second chambers of the mold after the skin has formed on the friction member.

* * * * *